July 13, 1954  J. T. ABDO  2,683,347
HYDRAULIC CONTROL APPARATUS
Filed Jan. 9, 1950
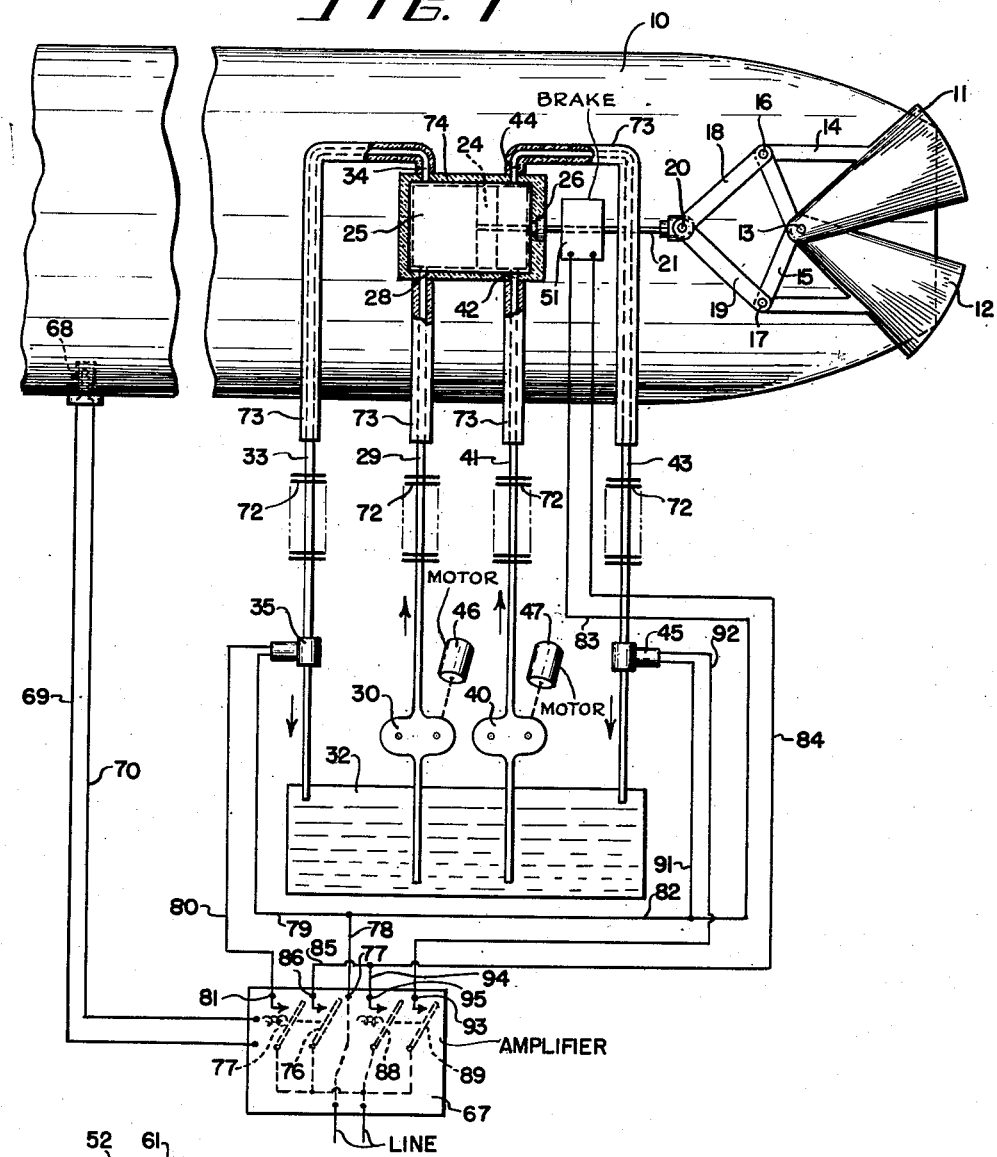
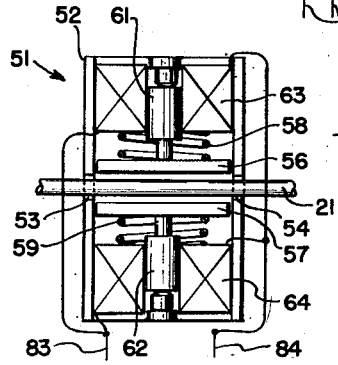
Inventor
JOSEPH T. ABDO
By George H. Fisher
Attorney Patented July 13, 1954

2,683,347

UNITED STATES PATENT OFFICE 2,683,347

HYDRAULIC CONTROL APPARATUS

Joseph T. Abdo, Minneapolis, Minn., assignor to Minneapolis-Honeywell Regulator Company, Minneapolis, Minn., a corporation of Delaware Application January 9, 1950, Serial No. 137,559

3 Claims. (Cl. 60—35.6)

The present idea relates to hydraulic actuators adapted for use under adverse temperature conditions.

Some uses for actuators, such as for operating the tail cone mechanism of jet engines, impose rigorous conditions as to power, weight, compactness and resistance to excessive temperatures. Hydraulic actuators have many advantages for this service but the prior art devices cannot tolerate the high temperatures existing immediately adjacent such an engine.

By insulating the actuator reasonably well from the hot surfaces of the engine and by continuously circulating hydraulic fluid through the actuator and through suitable heat exchange surface, it becomes feasible to use hydraulic actuators for this difficult application. To operate such an actuator, of the cylinder and piston type, the piston rod of the actuator is normally held by a brake and released only when movement is desired, movement being caused by closing one or the other of the outlet passages from the cylinder to thus build up pressure on one side of the piston. As the actuator is moving only a small portion of the time, the momentary stoppage of one of the circulating paths is permissible. Obviously, such an actuator is also advantageous under conditions of extreme cold, the hydraulic fluid serving to add heat instead of carrying it away, as in the present case.

It is thus an object of this invention to provide an improved hydraulic actuator wherein the hydraulic fluid is also used as a heat exchange fluid for keeping the actuator at reasonable temperatures.

It is a further object to provide a hydraulic actuator wherein the hydraulic fluid is normally circulated at a low pressure and high pressure is exerted only when movement is required.

It is an additional object to provide a hydraulic actuator wherein the moveable element is normally held stationary by a brake device which is released only when movement is desired.

These and other objects will become apparent upon a study of the following specifications and drawing wherein:

Figure 1 is a schematic view of the present control apparatus attached to the tail cone mechanism of a jet engine.

Figure 2 is a schematic view of the brake shown in Figure 1, somewhat enlarged.

In Figure 1, tail cone portion 10 on a jet engine, shown only in part, has a pair of clam shell shutter-like members or eyelids 11 and 12 pivoted to tail portion 10 by fixed pivots 13, only one of which is shown. These shutter-like members, or eyelids, are used to vary the effective area of the jet issuing from the engine for controlling the operating characteristics of the engine and regulating the thrust exerted. An offset bracket 14 is formed on the upper rear portion of member 11 and a similar bracket 15 is formed on the lower rear portion on member 12, these brackets being connected by pivot pins 16 and 17 to links 18 and 19, respectively, which are connected by pin 20 to piston rod 21, members 11 and 12 thus being operable about pivot 13 upon reciprocable movement of piston rod 21.

Piston rod 21 is attached to piston 24 reciprocable in cylinder 25, the cylinder being attached to tail portion 10 of the engine by means not shown. Piston rod 21 enters cylinder 25 through a packing gland 26 so that pressure may be applied to either side of the piston for reversible operation thereof. An inlet connection or opening 28 is formed in the left end of cylinder 25, connection 28 being connected by conduit 29 to the discharge port of a positive displacement type pump 30 which is arranged to pump liquid from a reservoir 32. Liquid pumped through conduit 29 into the left end of cylinder 25 is returned to reservoir 32 by a conduit 33 connected to outlet connection or opening 34, said conduit 33 being controlled by a normally open solenoid valve 35.

In a similar fashion, positive displacement pump 40, similar to 30, pumps liquid through conduit 41 and inlet connection 42 into the right end of cylinder 25, said fluid being returned to the reservoir by conduit 43 attached to outlet connection 44, conduit 43 being controlled by a normally open solenoid valve 45. Pumps 30 and 40 are intended to be continuously operated, whenever the jet engine is operated, by motors 46 and 47, as shown, or they may be driven by the accessory drive of the engine.

Piston rod 21 is normally held immovable by brake means 51, said brake being shown schematically in Figure 2. Brake 51 is constructed on a base comprising a channel iron member 52 attached to engine portion 10 by means not shown, the side flanges of said member being notched at 53 and 54 to permit free passage of piston rod 21. A pair of brake shoes 56 and 57 are slideably arranged in channel member 52 and are urged into engagement with rod 21 by springs 58 and 59, respectively, springs 58 and 59 being strong enough to prevent movement of the piston rod 21 by any forces likely to be imposed on it by members 11 and 12 and the connecting linkage. To permit movement of rod 21, brake shoes 56 and 57 are retracted against springs 58 and 59, as shown in Figure 2, by solenoid armatures 61 and 62 coacting with solenoid windings 63 and 64, respectively, windings 63 and 64 being connected in series or in parallel, as shown, so that they are simultaneously energized or deenergized. Obviously, brake 51 may be of any suitable sort that will perform the required function and may use a hydraulic actuator such as above described for moving the brake shoes against their biasing springs.

The energization of brake 51 and of valves 35 and 45 may be controlled by a suitable network circuit and discriminator type amplifier 67, such as described in Upton Patent 2,423,534, issued July 8, 1947, with the amplifier relays each being of the double pole type for handling two independent circuits. Obviously, instead of modifying the relays of the amplifier, the conventional single pole amplifier relays shown in the patent may be used to control suitable double pole load relays.

A temperature responsive resistor 68 exposed to the combustive chamber temperature just ahead of the turbine blades, or at any other suitable location, is connected by wires 69 and 70 to amplifier 67 so that it, in conjunction with the other network circuit components incorporated in the amplifier, controls the amplifier to operate one or the other of its relays as the combustion temperature varies one way or the other from the desired value. Instead of controlling the tail cone apparatus by temperature, as shown, control may be exercised as a function of engine speed, may be manually controlled, or any other suitable function indicative of a need for adjusting said apparatus may be used for control. When manual control is used, and in some cases where speed is the controlling function, amplifier 67 may be replaced by a similar set of switches controlled manually or by a speed governor, as the case may be, these variations being conventional and well known in the art. The control circuit described gives what is known as "floating" control and is satisfactory where there is a close correlation between the speed of the actuator and the speed of change of the temperature. However, the system can be made a proportional one by connecting a follow-up potentiometer into the control network and arranging it to be adjusted by the tail cone apparatus or the piston rod, as is conventional.

Cooling fins 72 may be used on conduits 33, 29, 41 and 43 at points away from the engine or any other suitable cooling means may be provided to thus dissipate the heat removed from the actuator by the circulating fluid. The portions of conduits 33, 29, 41 and 42 near the engine are covered by heat insulation 73 and cylinder 25 is shielded by similar insulation 74.

Operation

With the jet engine running and pumps 30 and 40 operating, hydraulic liquid is being pumped through the cylinder 25 on both sides of piston 24 and because piston rod 21 is firmly held by brake 51, members 11 and 12 remain in their adjusted positions. If the temperature affecting device 68 should now fall, amplifier 67 operates to pull in relay switch arms 76 and 77. This causes valve 35 to be energized and closed by the circuit; common output terminal 77, wire 78, wire 79, valve 35, wire 80 and output terminal 81. At the same time, brake 51 is energized by the circuit: output terminal 77, wire 78, wire 82, wire 83, brake 51, wire 84, wire 85 and output terminal 86. Energizing brake 51 pulls brake shoes 56 and 57 out of engagement with rod 21 and the closing of valve 35 causes pressure to rapidly build up in the left end of cylinder 25, thus causing piston 24 to move to the right and further close members 11 and 12. As members 11 and 12 tend to close, air flow through the engine diminishes, thus tending to richen the combustible mixture and to increase the combustion temperature to thus restore the temperature to the desired value. Upon the proper temperature being reached, relay blades 76 and 77 are dropped out, thus opening the energizing circuits for valve 35 and brake 51, brake 51 then holding rod 21 in its new position. While piston 24 was being moved to the right, there was no circulation of fluid through the left end of cylinder 25 but circulation continued in the right end of the cylinder, the fluid displaced by movement of the piston combining with the circulating fluid going to the reservoir through conduit 43.

Should the temperature at 68 rise above the desired value, relay switch blades 88 and 89 are pulled in, thus energizing valve 45 by the circuit: output terminal 77, wire 78, wire 82, wire 91, valve 45, wire 92 and output terminal 93. At the same time, brake 51 is energized by the circuit: terminal 77, wire 78, wire 82, wire 83, brake 51, wire 84 and wire 94 to terminal 95. This closes valve 45 and releases brake 51, thus permitting piston 24 to move to the left and open members 11 and 12, thereby increasing the air flow through the engine. Upon the temperature being sufficiently reduced by the added air flow, amplifier 67 drops out relay blades 88 and 89 and piston rod 21 is firmly held in its new position by brake 51. During this last operation, continuous circulation was stopped at the right end of cylinder 25 but circulation continued in the left end. As the adjustments are made in a very short period of time, these interruptions to the circulation are only momentary and do not appreciably interfere with the carrying away of excess heat by the circulating liquid.

The present arrangement may equally well be used where the operator is exposed to excess cold, the circulating liquid then being used to add heat instead of removing it.

Because many substitutions and equivalents will become apparent upon a study of the above specifications and drawing, the scope of this invention should be determined only by the appended claims.

I claim:

1. An actuator for the adjustable tail cone apparatus of a jet engine comprising a cylinder adapted to be attached to the outside of said engine, heat insulation arranged to shield said cylinder from heat, a piston movable in said cylinder, a piston rod for connecting said piston to said tail cone apparatus for operation thereof, fluid inlet and outlet connection adjacent each end of said cylinder, fluid conduit means including pumping means arranged to independently supply said inlets with fluid, said pumping means being of the positive displacement type and arranged to be operated continuously when the system is in operation, normally open electrically operated shut-off valves for preventing flow through the outlet connections from said cylinder, electrically operable brake means having biasing means for normally preventing operation of said piston rod and energizable to overcome the biasing means and permit operation of said rod, and means responsive to a condition indicative of a need for operation of said apparatus for simultaneously energizing said brake means and operating one or the other said shut-off valve to close its respective outlet connection.

2. A hydraulic actuator comprising a cylinder, a piston movable in said cylinder, a piston rod connecting to said piston and actuated thereby, inlet fluid connections at each end of said cylinder and on opposite sides of said piston, outlet fluid connections at each end of said cylinder and opposite said inlet connections, remotely located fluid pumping means, a reservoir, conduit means connecting said pumping means to said reservoir and said inlet connections, heat insulation means for said cylinder, said insulation shielding said cylinder from heat, first and second heat dissipation means, first and second electric valve means, conduit connection means including said first heat dissipation means and said first valve means for connecting one of said outlet connections to said reservoir, fourth conduit connection means including said second heat dissipation means and said second valve means connecting the other of said outlet connections to said reservoir, brake means normally biased to prevent movement of said piston rod and operable electrically against said bias to permit movement of said piston rod, said brake means being exterior of said cylinder, and means including a relay operable in response to a condition indicative of the need of operation of the apparatus connected in controlling relation to said first and second valve means and said brake means.

3. An actuator for use under adverse temperature conditions comprising a cylinder, said cylinder being covered by heat insulation means to reduce the transfer of heat to the inside of said cylinder, a piston movable in said cylinder and connected to a rod, inlet conduits connected at the ends of said cylinder on opposite sides of said piston, remotely located pumping means, connection means connecting each of said inlet conduits through said pumping means to a reservoir, outlet conduits connected at the ends of said cylinder opposite said inlet conduits, a plurality of valve means, conduit means including one of said valve means for connecting each of said outlet connections to said reservoir, electrically operated brake means normally spring biased in braking relation to said piston rod, and electrical relay means for controlling said brake means and said valve means.

References Cited in the file of this patent

UNITED STATES PATENTS

| Number | Name | Date |
|---|---|---|
| 750,434 | Crafts | Jan. 26, 1904 |
| 1,264,422 | Moard | Apr. 30, 1918 |
| 1,403,569 | Rogers | Jan. 17, 1922 |
| 1,952,806 | Hyland | Mar. 27, 1934 |
| 2,105,473 | Dean | Jan. 18, 1938 |
| 2,281,838 | Hadley | May 5, 1942 |
| 2,408,770 | Frische et al. | Oct. 8, 1946 |
| 2,477,452 | Guins | July 26, 1949 |
| 2,514,248 | Lombard et al. | July 4, 1950 |

FOREIGN PATENTS

| Number | Country | Date |
|---|---|---|
| 412,534 | Germany | Apr. 23, 1925 |
| 19,484 | Switzerland | Feb. 26, 1900 |